(12) United States Patent
Lo

(10) Patent No.: US 9,857,060 B2
(45) Date of Patent: Jan. 2, 2018

(54) LED ILLUMINATION CONTROL SYSTEMS AND METHODS

(71) Applicant: Wing Kong Lo, Hong Kong (HK)

(72) Inventor: Wing Kong Lo, Hong Kong (HK)

( * ) Notice: Subject to any disclaimer, the term of this patent is extended or adjusted under 35 U.S.C. 154(b) by 83 days.

(21) Appl. No.: 15/089,486

(22) Filed: Apr. 2, 2016

(65) Prior Publication Data

US 2017/0284639 A1 Oct. 5, 2017

(51) Int. Cl.
*F21V 14/02* (2006.01)
*G03B 15/02* (2006.01)
*F21Y 115/10* (2016.01)
*F21Y 105/18* (2016.01)

(52) U.S. Cl.
CPC ............. *F21V 14/02* (2013.01); *G03B 15/02* (2013.01); *F21Y 2105/18* (2016.08); *F21Y 2115/10* (2016.08)

(58) Field of Classification Search
CPC ..... F21V 14/02; G03B 15/02; F21Y 2105/18; F21Y 2115/10
See application file for complete search history.

(56) References Cited

U.S. PATENT DOCUMENTS

| 2008/0212323 | A1* | 9/2008 | Chien | H04N 5/2354 362/249.07 |
| 2009/0016574 | A1* | 1/2009 | Tsukahara | A61B 5/117 382/117 |
| 2009/0323341 | A1* | 12/2009 | Chui | G09G 3/3406 362/249.02 |
| 2015/0355407 | A1* | 12/2015 | Yan | G02B 6/0088 362/607 |

\* cited by examiner

*Primary Examiner* — Sonji Johnson

(57) ABSTRACT

An illumination apparatus has a circular base plate and a plurality of tracks arranged radially about the base plate. LED modules are disposed upon the tracks, and transmission members coupled to the LED modules move the LED modules along the tracks. A distance measurement sensor is mounted on one side of the base plate, and is used to measure a distance value of an illuminated object. A processor is configured to determine a desired radius value for the plurality of LED modules based on the distance value and move the transmission members according to the desired radius value.

11 Claims, 4 Drawing Sheets

LED ILLUMINATION CONTROL SYSTEMS AND METHODS

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISK APPENDIX

Not Applicable

BACKGROUND

Machine vision technology is widely used to replace the human eye in extracting information from an image. In machine vision systems, an image is captured, and then image-processing techniques are used to extract the required information from the image. Certain inputs, such as measurement and control inputs, may also be used during the processing of the image. The illumination device for the subject being captured is an important factor that determines the quality of the image captured, and, therefore, the quality of the extracted information. Collecting a good, high-contrast image cannot only greatly reduce the workload of the image processing, but also can greatly improve the accuracy and speed of the extraction of information during the image processing. Currently, annular light sources are used in machine vision lighting systems. These annular lighting systems are basically fixed diameter, so the diameter of the light source is unchangeable when the environment changes or characteristics of the subject under illumination change. The diameter of the light source is an important factor in providing even illumination, so if the environment changes, for example, the distance from the light source to the subject changes, a fixed-diameter light source tends to provide uneven illumination, resulting in poor image acquisition.

SUMMARY OF THE INVENTION

A LED light source comprises a base plate, a processor, and a plurality of LED modules. The LED modules are disposed on a surface of the base plate on separate, radially arranged tracks. The LED modules are movable along the tracks to adjust the radius of the LED light source. A distance measurement sensor is mounted to one side of the surface of the base plate, and is used to acquire a distance value between the LED light source and the subject being illuminated. In operation, the processor reads the distance value and calculates a desired radius from the distance value. The calculation of the desired radius value may also use lighting characteristics of the LED lights. After the desired radius is calculated, the processor moves the LED modules along the tracks so they are arranged in a circle with the desired radius.

In one aspect, the invention is directed toward an illumination apparatus useful for a machine vision system, comprising: a plurality of tracks of equivalent shape and size supported by a circular base plate, the tracks arranged radially about the base plate; a plurality of LED modules, each LED module disposed upon one of the plurality of tracks; a plurality of transmission members for moving the plurality of LED modules along the plurality of tracks, wherein each transmission member is coupled with one of the plurality of LED modules; a distance measurement sensor mounted on one side of the base plate for measuring a distance value of an illuminated object; and a processor configured to determine a desired radius value for the plurality of LED modules based on the distance value and move the transmission members according to the desired radius value.

Implementations of the apparatus may include one or more of the following. Each transmission member may comprise: a motor supported by a motor mount affixed to the base plate, the motor connected in parallel to the processor, a shaft connected to the motor via a shaft coupling, and a roller mounted upon the shaft and housed in a roller track, in which the roller is coupled with one of the plurality of LED modules. The roller may have two wheels, one on each side of the roller for moving along the track. The shaft may comprise a two-position stop switch mounted on each end of the shaft. Each of the plurality of LED modules may comprise a LED diffuser, a LED array, and a LED substrate. The LED diffuser may be disposed in between the LED array and LED substrate. The LED modules may be disposed on the tracks so that the light from the LED modules is directed toward the base plate. The apparatus may further comprise a casing having a central opening of equivalent shape and size to that of a central opening of the base plate. The processor may be configured to control the radius of the plurality of LED modules according to a desired radius value, the desired radius value calculated based on the distance value measured by the distance measurement sensor and the emission coefficient of the plurality of LED modules.

In another aspect, the invention is directed toward a method for a machine vision system comprising a circular base plate having a plurality of LED modules, comprising: obtaining a distance value using a distance measurement sensor; determining a desired radius value based on the distance value; determining desired positions for the LED modules based on the desired radius value; and moving the LED modules according to the desired positions.

Implementations of the method may include one or more of the following. The determining a desired radius value may be further based on an emission coefficient of the plurality of LED modules. The determining a desired radius value may be further based on an initial radius value of the plurality of LED modules.

DETAILED DESCRIPTION OF THE INVENTION

Figure 1:
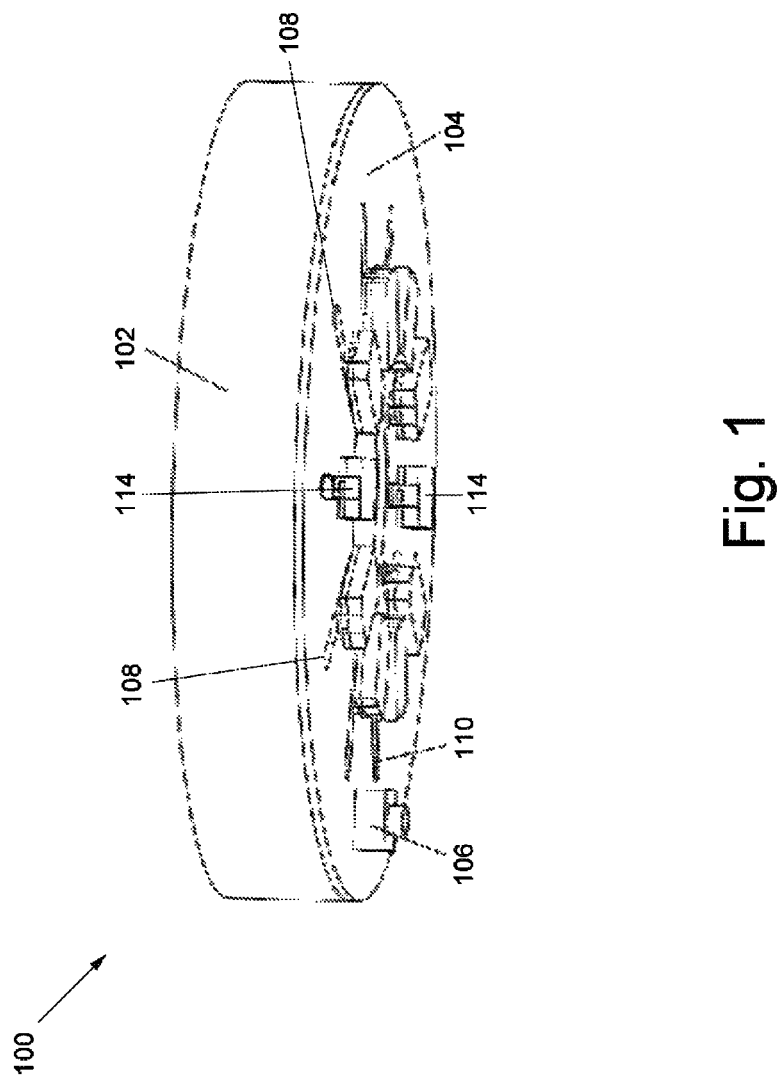
FIG. 1 illustrates one embodiment of a LED illumination system according to one aspect of the invention.

FIG. 1 illustrates an example embodiment of the present invention. Machine vision system LED light source 100 comprises a case 102, a circular base plate 104, a measurement sensor 106, and a processor (not shown). Case 102 may be constructed of any suitable material, e.g., plastic, metal, metal alloys, etc. Circular base plate 104 is attached to one side of case 102, and may be constructed of a similar material as case 102. Alternatively, base plate 104 may be constructed of a different material from case 102. Measurement sensor 106 is able to sense and determine the distance between the sensor and a subject being illuminated. Any type of distance sensor may be used, e.g., infrared, laser, ultrasonic, sonic tape, etc. Disposed on circular base plate are a plurality of tracks 108, which are arranged radially about the base plate 104. In one embodiment, tracks 108 are of an equivalent shape and size.

Each track 108 comprises a LED module that can move along the track, for example, via a motor controlled by the processor. In one embodiment, each track 108 comprises drive rail 110, a drive unit (not shown), and LED module 114. Drive rails 110 may be attached to base plate 104 using an attachment means, such as screws, rivets, etc. Each of drive rails 110 may be constructed of a suitable material, such as plastic, metal, metal alloys, etc. Each of the drive units is used for driving a LED module 114 along drive rails 110. In one embodiment, the drive units are attached to base plate 104 at the end of tracks 108, towards the center of base plate 104. Alternatively, the drive units may be attached to base plate 104 at the opposite end of tracks 108, along the edge of base plate 104. The drive units may comprise a motor, motor mount, and a coupling. The motors are attached to base plate 104 via the motor mount. The coupling may comprise a shaft connecting the motor to a roller coupled to a LED module 114. The motor drives the roller, the roller being mounted on the shaft and housed in one of drive rails 110. This configuration allows a motor to move a LED module 114 along a track 108 in response to control signals from the processor. The roller may have two (2) wheels, one on each side of the roller for moving along the track 108. Alternatively, the roller may have more or less than two (2) wheels. In addition, the shaft may comprise a position limit switch or stop switch, which may set limits regarding how far along the track 108 the LED module 114 can move.

Figure 2:
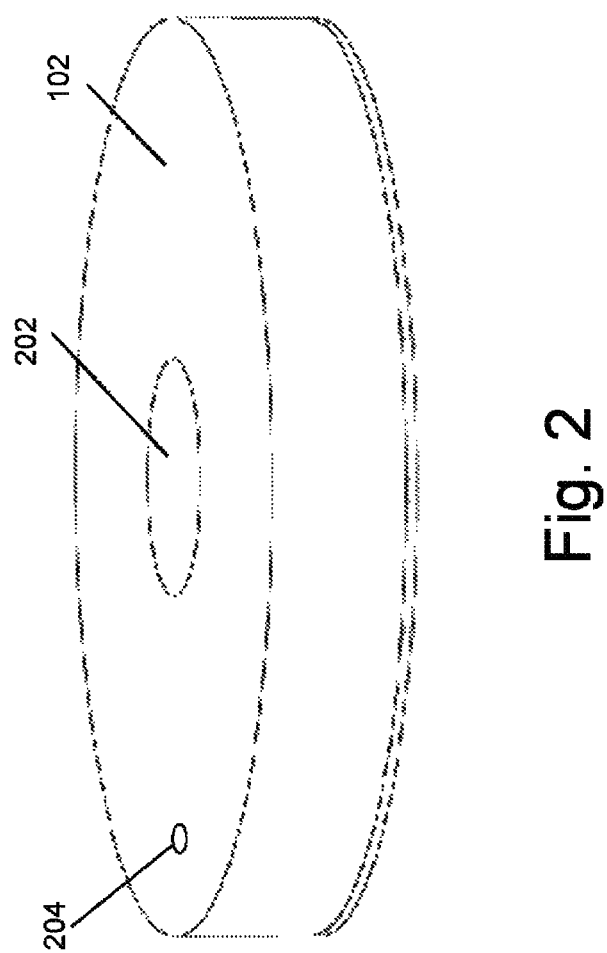
FIG. 2 illustrates one embodiment of a casing for the LED illumination system according to one aspect of the invention.

One embodiment of case 102 is illustrated in FIG. 2. In this embodiment, case 102 comprises opening 202, which allows light from LED modules 114 to reach the subject. In an embodiment, base plate 104 has an opening at the center to allow light from LED modules 114 to enter case 102, after which the light will exit case 102 through opening 202 in order to illuminate the subject. Opening 204 allows the distance sensor 106 to determine the distance between the LED light source 100 and the illuminated subject. A signal from the distance sensor, e.g., in the case of a sonic tape sensor, a sound signal, passes through the case using opening 204 to reach the subject.

Figure 3:
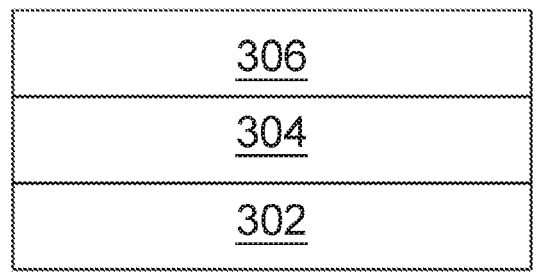
FIG. 3 illustrates one embodiment of a LED module according to one aspect of the invention.

One embodiment of a LED module 114 is illustrated in FIG. 3. LED module 114 may comprises LED substrate 302, LED diffuser 304 and LED array 306. Other arrangements of LED module 114 are possible, for example, the LED array may be between the LED substrate and the LED diffuser, or the LED substrate may be between the LED diffuser and the LED array. LED module 114 is of a suitable shape, such as rectangular, circular, or oval. In one embodiment, LED modules 114 may be mounted on track 108 in an upside down configuration, to allow for the proper illumination of the subject. Alternatively, LED modules may be mounted on track 108 right side up, depending on the configuration of the LED modules. LED modules 114 are mounted on track 108 in such a way as to allow for the movement of LED modules 114 along track 108. Also, in an embodiment, a reflector may be used to reflect light from the LED modules into case 102 through the opening in base plate 104.

In operation, the distance measurement sensor is used to determine the distance between machine vision system LED light source 100 and the subject being illuminated. Based on the distance measurement, a desired radius value is determined. The LED modules are then moved to the correct positions along track 108 based on the desired radius value. The desired radius value may also depend on emission characteristics of the LED modules.

The processor may be any suitable digital processor, such as a microprocessor, CPU, GPU, ASIC, etc. The processor instructions may be laid out on a computer-readable medium, generally non-transitory, and read by the processor, and are sufficient to enable the processor to implement the required calculations and methods of the invention. The computer-readable medium may be a solid-state storage, such as RAM or ROM. Alternatively, the processor may be hard-wired to implement the methods of the invention, e.g., an ASIC.

Figure 4:
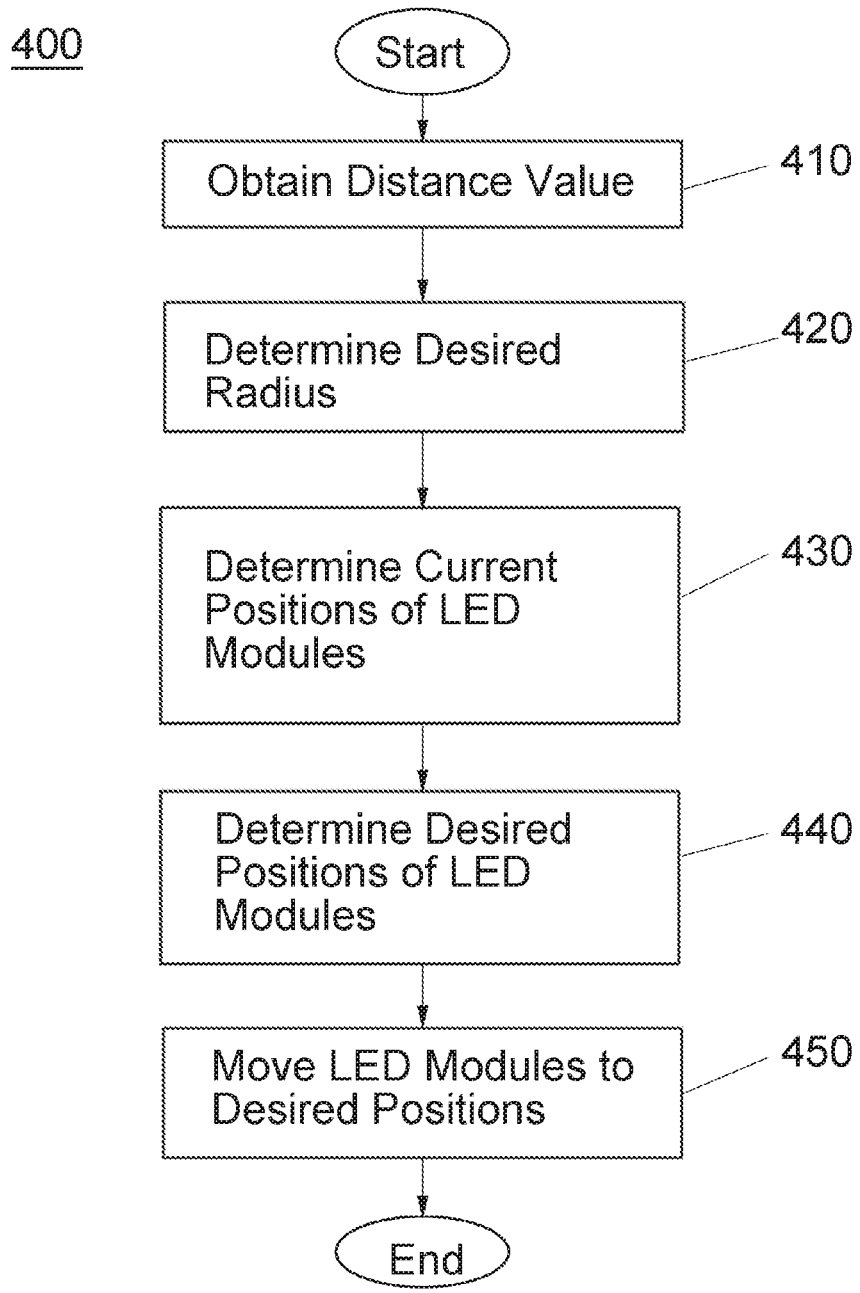
FIG. 4 illustrates one embodiment of a method according to one aspect of the invention.

FIG. 4 illustrates a method 400 according to one aspect of the present invention. In step 410, the distance value is obtained from the distance measurement sensor. In step 420, a desired radius value is determined based on the distance value. An emission coefficient of the plurality of LED modules may be used in calculating the desired radius value. An example formula for this calculation is $r=Ck(Ax+B)^n$, where k is the distance between the LED light source and the illuminated subject, and x is the emission coefficient of the LED modules. A, B, and C are constants, the exact values of which depend upon the desired operation of the LED module. In one embodiment, A can be between 0.7 and 0.711, B can be between 2.221 and 2.23, and C can be between 1.4 and 1.5. n is the exponent, and, in one embodiment, is $-0.5$. Alternatively, the emission coefficient x may not be used in the formula.

In step 430, the current positions of the LED modules are determined. In step 440, the desired positions of the LED modules are calculated based on the desired radius value. In step 450, the processor actuates the motors to move the LED modules to the desired positions.

Using this apparatus or method and moving the LED modules based on the distance between the LED light source and the subject being illuminated enables a more uniform illumination of the subject. This enables the machine vision system to be able to capture better, more-detailed visual images, which in turn allows for an image processing system to process the image more quickly and also to obtain better information from the captured image. In addition, human error caused by human eyes is reduced. This apparatus and method is applicable in a wide range of applications, including aerospace, industrial, military and civilian applications.

What is claimed is:

1. An illumination apparatus useful for a machine vision system, comprising:
    a plurality of tracks of equivalent shape and size supported by a circular base plate, the tracks arranged radially about the base plate;
    a plurality of LED modules, each LED module disposed upon one of the plurality of tracks;
    a plurality of transmission members, wherein each transmission member is coupled with one of the plurality of LED modules;
    a distance measurement sensor mounted on one side of the base plate for measuring a distance value of an illuminated object; and a processor configured to determine a desired radius value for the plurality of LED modules based on the distance value and move the transmission members according to the desired radius value.

2. The apparatus of claim 1, wherein each transmission member comprises:
 a motor supported by a motor mount affixed to the base plate, the motor connected in parallel to the processor,
 a shaft connected to the motor via a shaft coupling, and
 a roller mounted upon the shaft and housed in a roller track, in which the roller is coupled with one of the plurality of LED modules.

3. The apparatus of claim 2, wherein the roller has two wheels, one on each side of the roller for moving along the track.

4. The apparatus of claim 2, wherein the shaft comprises a two position stop switch mounted on each end of the shaft.

5. The apparatus of claim 1, wherein each of the plurality of LED modules comprises a LED diffuser, a LED array, and a LED substrate.

6. The apparatus of claim 5, wherein the LED diffuser is disposed in between the LED array and LED substrate.

7. The apparatus of claim 1, wherein the LED modules are disposed on the tracks so that the light from the LED modules is directed toward the base plate.

8. The apparatus of claim 1, further comprising a casing having a central opening of equivalent shape and size to that of a central opening of the base plate.

9. The apparatus of claim 1, wherein the processor is configured to control the radius of the plurality of LED modules according to a desired radius value, the desired radius value calculated based on the distance value measured by the distance measurement sensor and the emission coefficient of the plurality of LED modules.

10. A method for a machine vision system comprising a circular base plate having a plurality of LED modules, comprising:
 obtaining a distance value using a distance measurement sensor;
 determining a desired radius value based on the distance value, wherein the determining a desired radius value is further based on an emission coefficient of the plurality of LED modules;
 determining desired positions for the LED modules based on the desired radius value; and
 moving the LED modules according to the desired positions.

11. The method of claim 10, wherein the determining a desired radius value is further based on an initial radius value of the plurality of LED modules.

* * * * *